United States Patent [19]

Kindersley

[11] 4,037,819
[45] July 26, 1977

[54] BUTTERFLY VALVE HAVING METAL-TO-METAL SEALING WITH CONICAL ANGLE-TRANSPORTED VANE

[75] Inventor: Peter G. Kindersley, Glens Falls, N.Y.

[73] Assignee: Kamyr Valves Inc., Glens Falls, N.Y.

[21] Appl. No.: 663,614

[22] Filed: Mar. 3, 1976

[51] Int. Cl.² .............................................. F16K 1/226
[52] U.S. Cl. ..................................... 251/306; 251/305
[58] Field of Search ........................ 251/305, 306, 307

[56] References Cited

U.S. PATENT DOCUMENTS 3,156,445  11/1964  Swain ................................. 251/307 X
3,963,213   6/1976  Brattberg ............................ 251/306

Primary Examiner—Robert G. Nilson
Attorney, Agent, or Firm—Cushman, Darby & Cushman

[57] ABSTRACT

A butterfly valve that has a metal valve seat and a metal vane, providing fluid-tight metal-to-metal sealing. The valve seat is annular and has an inner circular line surface for engagement with the metal vane. The vane is a conical angle-transported disc, the upper face of the disc being angle-transported between 20° and 40° with respect to the lower face. Both faces are true circles, as is every section of the vane parallel to the faces. When the vane mates with the valve seat, true circular line contact sealing results, the valve seat only being very slightly deflected by the vane to effect sealing.

5 Claims, 3 Drawing Figures

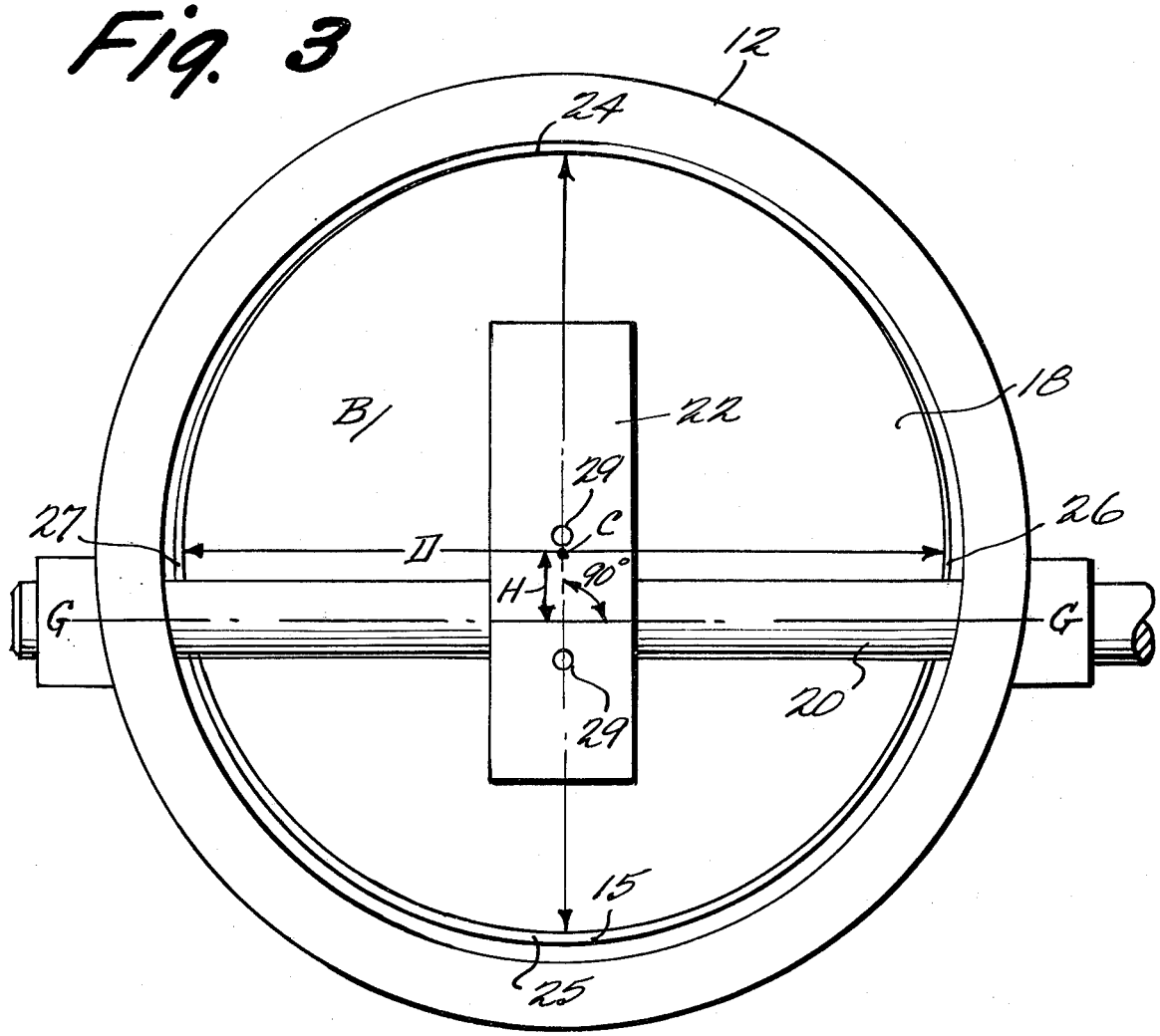
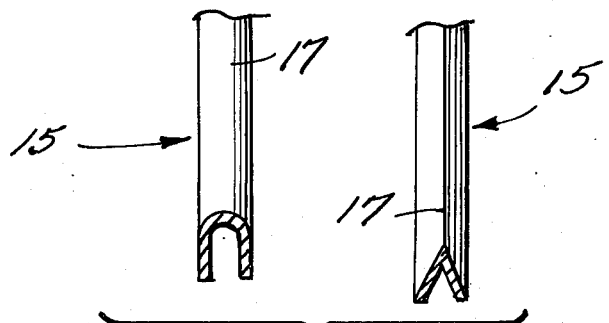

BUTTERFLY VALVE HAVING METAL-TO-METAL SEALING WITH CONICAL ANGLE-TRANSPORTED VANE

BACKGROUND AND SUMMARY OF THE INVENTION

The invention relates to a butterfly valve that can be used under a wide variety of fluid temperature, chemical and abrasion conditions. Butterfly valves in general are a popular type of valve because of the simplicity of the construction thereof, and because they are inexpensive to make. Conventional butterfly valves, such as shown in U.S. Pat. Nos. 2,986,373 and 3,583,668, are very practical, under many conditions; however, since they require the use of elastomers around the periphery of the vane or at the valve seat to effect sealing, they have limited use. Such conventional valves cannot normally be used where the temperature is above about 300° F. of where adverse chemical or abrasive conditions exist. Other valves, such as shown in U.S. Pat. No. 3,931,955, may attain circular line contact; however, when wear occurs, the valve seat must be replaced, a difficult process.

According to the present invention, a butterfly valve is provided that is useful in environments with temperatures in excess of 1000° F. and in environments where solvents, chemical reagents and abrasive fluids are to be valved. The valve of the invention provides for metal-to-metal sealing of the vane and the valve seat, no elastomers being necessary to effect a fluid-tight seal. An annular metal valve seat is mounted in a valve body and cooperates with a metal disc vane. The vane is so constructed and mounted for rotation within the valve body that circular line contact is provided between the valve seat member and the vane. This circular line contact makes the utilization of a metal-to-metal seal possible because the valve seat need be deformed only very, very slightly in order to have good contact pressure between itself and the vane at all points of the contacting line. This is in stark contrast to vanes that do not have a circular contact line, wherein high pressure is required at the points where the seal has to be deformed the most, in order to establish a much lower contact pressure at other points in the contacting line.

According to the present invention, the vane is formed as a conical angle-transported disc, the disc having a thickness approximately 1/10 – 1/20 its diameter. A conical angle-transported disc is a disc which may be considered to be a portion of a cone having spaced parallel faces of different diameter and a center line through the circular faces of different diameter being perpendicular to the faces; then the center line is angle-transported so that the center line forms an angle of greater than 0° with a line perpendicular to the upper and lower faces (the center line no longer being perpendicular to the upper and lower faces). While there have been proposals to provide circular line contact with a cylindrical angle-transported disc vane, there have been problems with such an arrangement since there is an awkward tightness of the vane as it passes through the seat, at about an 8° angle, prior to seating. This tightness causes the seat to be moved outwardly as the vane passes through it, and, thus, there is excessive leakage where the vane has pushed the seat away. According to the present invention, these problems have been avoided while still providing true circular line contact, by providing a conical angle-transported disc instead of a cylindrical angle-transported disc. (A cylindrical angle-transported disc is a disc that may be considered to originally be a portion of a cylinder having spaced parallel circular faces with a center line extending through the centers of the two faces and perpendicular to the faces; the center line is then transported through an angle so that it is disposed at an angle greater than 0° with respect to a line that is perpendicular to the two faces.) The conical angle-transported disc has an upper face of a diameter D' slightly less, approximately 1/50 – 1/100, than the diameter D of the lower face and an angle $\alpha$ of between 20° and 40° being formed between a centerline through the upper and lower faces and a line E perpendicular to the upper and lower faces. The vane is rotatable about an axis of rotation perpendicular to the direction of fluid flow through the valve body, and the circumferential edges on a diameter of the upper face perpendicular to the axis of rotation have an angle of generally about $\alpha$.

It is the primary object of the present invention to provide an improved butterfly valve having metal-to-metal sealing contact. This and other objects of the invention will become clear from an inspection of the detailed description of the invention, and from the appended claims.

BRIEF DESCRIPTION OF THE DRAWINGS

FIG. 2 is a detailed view of modifications of the shape a valve seat could have in the valve of FIG. 1; and FIG. 3 is a plan view of the valve of FIG. 1 looking in the direction of face A.

DETAILED DESCRIPTION OF THE INVENTION

Figure 1:
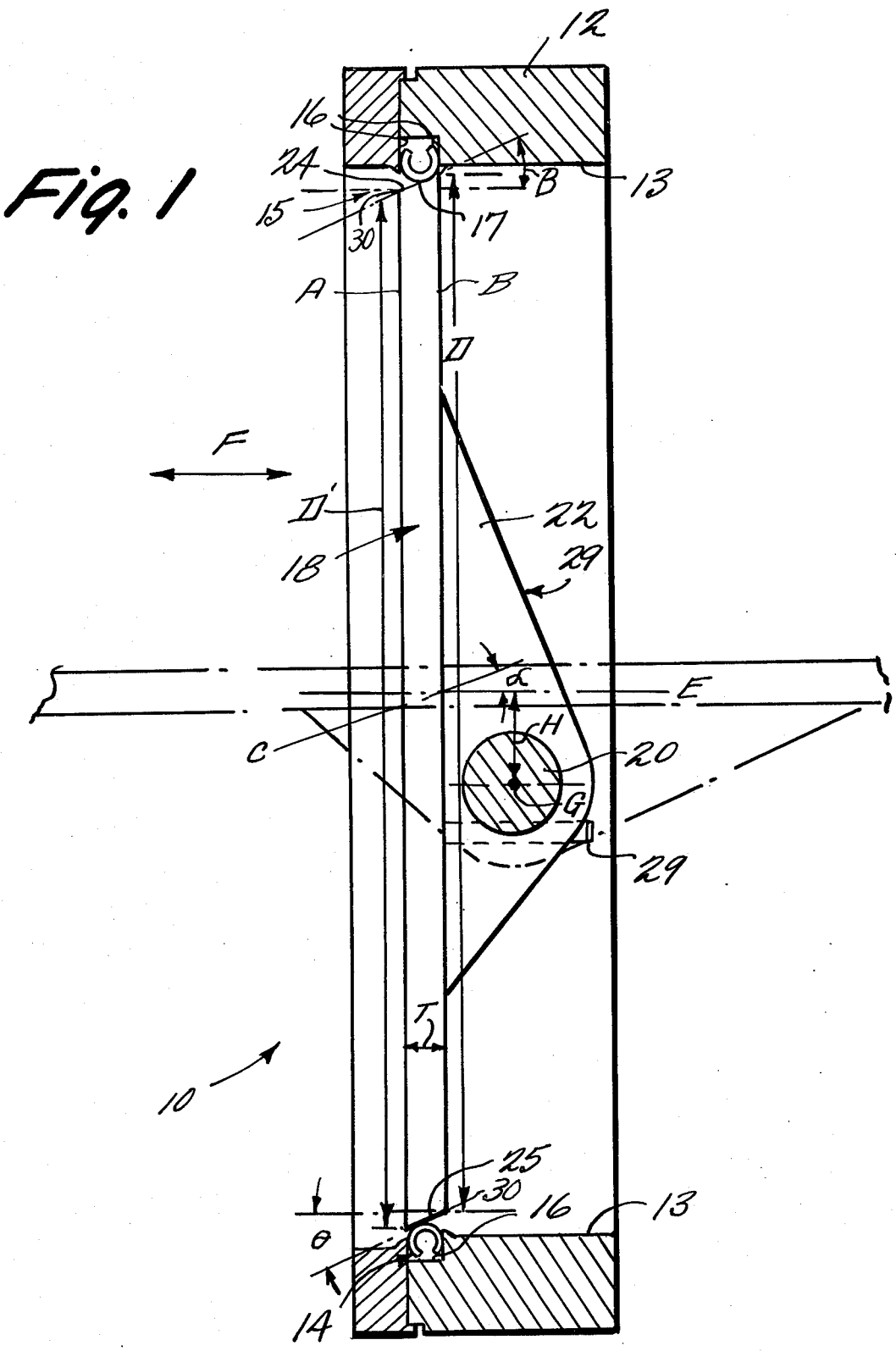
FIG. 1 is a side view with the valve body and seat in cross-section and the vane in elevation of an exemplary butterfly valve according to the present invention.

An exemplary butterfly valve according to the present invention is shown generally at 10 in FIG. 1. The valve 10 includes a valve body member 12 having a substantially circular, fluid-conducting bore 13 therein. A valve seat receiving opening 14 is formed in valve body member 12 in communication with the bore 13. An annular metal valve seat 15 is disposed in the opening 14, in abutting fluid-tight engagement with the side surfaces 16 of opening 14, the valve seat being in compression between the surfaces 16, although still radially movable a small amount in response to cooperative engagement with a pivotal vane 18. The valve seat 15 may have a variety of shapes, such as shown in FIG. 2, just so a circular interior mating surface 17 is provided.

The vane 18 is movable from a first position (dotted line in FIG. 1) wherein the major surfaces thereof are substantially parallel to the direction F of fluid flow through the bore 13 and wherein fluid may flow unrestricted past the vane, to a second position (solid line in FIG. 1) wherein it is in abutting fluid-tight engagement with the metal valve seat member 15. The vane 18 is also of metal so that the valve is resistant to high temperatures, solvents, chemicals and abrasive substances. The vane 18 comprises a metal disc having a thickness T about 1/10 to 1/20 of the diameter D of the face B thereof, the face A thereof having a diameter D' slightly smaller than D. Face A will hereinafter be referred to as the "upper face" since it is the face that is disposed on top when the vane 18 is in a horizontal position (assuming the body 12 in FIG. 1 is arranged vertically). This reference really has no meaning other than just to allow proper distinct reference to the two faces A and B; similarly face B will be referred to hereinafter as the "lower face".

The vane 18 is mounted for rotation about an axis G, the axis G being substantially perpendicular to the dimension F of fluid movement through the bore 13. A shaft 20 mounted in the body 12 is received by a support 22 attached to face B of vane 18, the support 22 insuring that the shaft 20 is mounted in back of the vane 18 so that it does not interfere with the contact between the vane and the metal valve seat 15. Support 22 may be attached to vane 18 by pins 29 or the like.

It will be seen that with a vane 18 as shown in the drawings cooperating with a valve seat member 15, the seat of the vane 18 with the valve seat 15 along surface 17 is an almost perfectly circular contact line. Therefore, the seat 15 need be deformed only very, very slightly in order to have good contact pressure between itself and the vane 18 at all points of the contacting line. If, by contrast, the vane 18 did not have a circular contact line with the surface 17 of seat 15, there would be high pressure required where the seal had to be deformed the most, in order to establish a much lower contact pressure between the seal 15 and the vane 18 at other points in the contacting line. Also, according to another aspect of the present invention, it is desirable that the centerline (axis) G of the shaft 20 be mounted slightly below (a distance H) the centerline C of the vane 18 so that the vane 18 has a slightly eccentric motion as it approaches the seat 15, resulting in a positive forcing of the vane 18 into the seat circle.

The vane 18 is a conical angle-transported disc. All sections through vane 18 parallel to faces A and B are true circles having a diameter between diameters D and D', the diameters decreasing uniformly from face B to face A. The face A of vane 18 is also translocated with respect to face B so that the centerline C through faces A and B makes an angle α of between about 20° and 40° with respect to a line E perpendicular to face A. Because the face A has diameter D' rather than D, however, the angle at edge 24 is slightly greater than α and the angle at edge 25 is slightly less than α, and the edges 26, 27 whereat the angle approaches 0°, are located slightly lower with respect to a diameter of face B, parallel to shaft 20 than if the vane were a cylindrical angle-transported disc. The valve seat 15 has an inner diameter approximately midway between D' and D. As an example of how vane 18 might be constructed, if face B had a diameter D of 10.0 inches, face A could have a diameter D' of 9.9 inches, the face A being approximately 1/100 of the diameter of face B smaller than face B. The angle α advantageously could be 30°, meaning that the angle β of edge 24 would be approximately 32.1°, and the angle θ of edge 25 about 27.8°, for a 1 inch thick vane.

By utilizing the vane 18, the touch of the "corners" of the vane as it moves through the seat 15 is eliminated, as compared to a cylindrical angle-transported vane, and the vane 18 and seat 15 only engage when actual mating takes place. It is noted that, if desired, all of the corners 30 may be rounded. Again, true circular contact is provided between vane 18 and seat 15, which contact allows the use of metal parts for both vane 18 and seat 15, and results in a simple solution to the classic problem of tight closure when metal parts are being used.

It will thus be seen that according to the present invention, a butterfly valve has been provided wherein metal parts may be utilized while completely fluid-tight sealing contact is achieved, and no undue deformation of the valve seat or excessive leakage occurs.

While the invention has been herein shown and described in what are presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A butterfly valve comprising:
    a body member having a substantially circular bore therethrough, fluid adapted to flow through said bore in a given direction,
    a metal annular valve seat member,
    means for mounting said annular valve seat member in said bore so that said annular member has a mating surface thereof disposed in said substantially circular bore and so that said annular valve seat member is radially movable with respect to said circular bore both toward and away an axis of said bore, said mounting means including a valve seat opening formed in said body member in communication with said substantially circular bore and having border surfaces, said valve seat having surfaces thereof engaging said border surfaces of said valve seat opening and preventing flow of fluid in said circular bore except interiorly of said mating surface,
    means for cooperating with said metal valve seat member to form circular line contact with said mating surface of said valve seat, said means including a metal vane comprising a conical angle-transported disc, said conical angle-transported disc vane having a circular upper face of diameter D' and a circular lower face of diameter D slightly greater than D', with every section through said disc parallel to the upper and lower faces thereof being a circle of diameter between D and D', D' being approximately 99/100th of D, and a center line through said circular upper and lower faces making an angle α between 20° and 40° with a line perpendicular to said vane disc upper and lower faces,
    said annular valve seat member having an inner diameter approximately midway between D and D', and
    shaft means for mounting said vane for rotation about an axis substantially perpendicular to the direction of fluid flow through said bore for movement from a first position wherein fluid may flow past said vane through said circular bore, to a second position wherein said vane is in circular line contact with said valve seat member and no fluid may flow there-past, said shaft means being attached to one face of said vane spaced a small distance therefrom.

2. A butterfly valve as recited in claim 1 wherein said vane disc has a thickness approximately 1/10 – 1/20 of its diameter.

3. A butterfly valve as recited in claim 1 wherein said shaft is so mounted to said vane that the axis of rotation of said vane is spaced from a perpendicular line passing through the center of the face of said vane to which said shaft is attached.

4. A butterfly valve as recited in claim 1 wherein said annular valve seat member has a hemisphere cross-section.

5. A butterfly valve as recited in claim 1 wherein said valve seat member has a V-shaped cross-section.

* * * * *